(12) United States Patent
Tsuboi et al.

(10) Patent No.: US 7,616,802 B2
(45) Date of Patent: Nov. 10, 2009

(54) LIGHT REFLECTION INTENSITY CALCULATION CIRCUIT

(75) Inventors: Eiju Tsuboi, Tokyo (JP); Tsuneo Ikedo, Tokyo (JP)

(73) Assignee: Digital Media Professionals, Inc., Tokyo (JP)

( * ) Notice: Subject to any disclaimer, the term of this patent is extended or adjusted under 35 U.S.C. 154(b) by 837 days.

(21) Appl. No.: 10/547,678

(22) PCT Filed: Mar. 5, 2004

(86) PCT No.: PCT/JP2004/002792

§ 371 (c)(1),
(2), (4) Date: Sep. 2, 2005

(87) PCT Pub. No.: WO2004/079663

PCT Pub. Date: Sep. 16, 2004

(65) Prior Publication Data

US 2006/0136532 A1 Jun. 22, 2006

(30) Foreign Application Priority Data

Mar. 6, 2003 (JP) ............................. 2003-107095
Jun. 18, 2003 (JP) ............................. 2003-200783

(51) Int. Cl.
*G06F 15/00* (2006.01)
*G06K 9/00* (2006.01)

(52) U.S. Cl. .................. 382/141; 382/154; 708/200

(58) Field of Classification Search ................. 382/141, 382/154; 708/200
See application file for complete search history.

(56) References Cited

U.S. PATENT DOCUMENTS 5,704,024 A * 12/1997 Voorhies et al. ............. 345/426

FOREIGN PATENT DOCUMENTS

JP 63-213079 9/1988

(Continued)

OTHER PUBLICATIONS

T. Yamana et al.; The Transactions of the Institute of Electronics, Information and Communication Engineers, vol. J73-DE-II, No. 6, Jun. 25, 1990, pp. 880-886.

(Continued)

*Primary Examiner*—Bhavesh M Mehta
*Assistant Examiner*—Michael Vanchy, Jr.
(74) *Attorney, Agent, or Firm*—Westerman, Hattori, Daniels & Adrian, LLP.

(57) ABSTRACT

A circuit for calculating a light reflected component with high accuracy. The circuit for calculating a reflected component of light reflected from an object having a rough surface comprises a means for storing the reflectance of an object in relation to the value $\phi$ or the value of cos $\phi$, letting a surface normal vector be denoted by a vector N, a light source incidence unit vector be denoted by a vector L, a line-of-sight unit vector be denoted by V, a half vector of the light source incidence vector L and the line-of-sight vector V be denoted by H and defining the inner products as N·L=cos $\theta$, N·V=cos $\gamma$, V·H=cos $\phi$, N·H=cos $\beta$; a means for storing a luminance distribution in relation to the value of $\beta$ or the value of cos $\beta$; a means for acquiring information on the reflectance term ($F_\lambda(\phi)$) of the reflected component according to the value of $\phi$ or the value of cos $\phi$ from the reflectance storing means; a means for acquiring information on the luminance distribution term (D'($\beta$)) of the reflected component according to the value of $\beta$ or the value of cos $\beta$ from the luminance distribution storing means; a means for acquiring information on max[0.5 cos $\theta$ cos $\phi$, 0.5 cos $\phi$ cos $\gamma$, cos $\theta$ cos $\beta$ cos $\gamma$] which is the maximum value out of 0.5 cos $\theta$ cos $\phi$, 0.5 cos $\phi$ cos $\gamma$, cos $\theta$ cos $\beta$ cos $\gamma$; a means for determining the reciprocal of the max[0.5 cos $\theta$ cos $\phi$, 0.5 cos $\phi$ cos $\gamma$, cos $\theta$ cos $\beta$ cos $\gamma$] and acquiring information on the geometrical attenuation factor term G'($\beta$, $\theta$, $\gamma$, $\phi$) of the reflected component; and a means for acquiring information on the reflected component from the information on the luminance distribution term (D'($\beta$)) and information on the geometrical attenuation factor term G'($\beta$, $\theta$, $\gamma$, $\phi$).

11 Claims, 5 Drawing Sheets

FOREIGN PATENT DOCUMENTS

| | | |
|---|---|---|
| JP | 6-28492 | 2/1994 |
| JP | 2000-322597 | 11/2000 |
| JP | 2002-208031 | 7/2002 |
| JP | 2003-030683 | 1/2003 |

OTHER PUBLICATIONS

K. Murakami et al.; Information Processing Society of Japan Kenkyu Hokoku, vol. 91, No. 43, May 24, 1991, pp. 59-66.

* cited by examiner

LIGHT REFLECTION INTENSITY CALCULATION CIRCUIT

FIELD OF INVENTION

The present invention relates to a computer graphics circuit to express specular reflection. The present invention also relates to a circuit for anisotropic reflection and devices to render images on the basis of said reflections.

BACKGROUND OF ART

A modeling of light-reflection is an important technology in order to render realistic images of three-dimensions. Some models based on the specific algorithms have been developed, e.g., Phong shading, which is one of the popular models used in a polygonal rendering scheme. The Phong shading algorithm assumes a uniform surface property of an object and disregards both behaviors of random reflection on a rough surface and the wave-length characteristic of light, while the Cook-Torrance model is a physical based model involving a rough surface property. This model expresses a specular reflection component Rs with the following equation (1).

$$Rs = \frac{D(\alpha) \cdot G \cdot \rho(\lambda, \theta)}{(N \cdot L)(N \cdot V)} \quad (1)$$

$$G = \min[1, Gs, Gm],$$

$$Gs = \frac{2(N \cdot H)(N \cdot L)}{V \cdot H},$$

$$Gm = \frac{2(N \cdot H)(N \cdot V)}{V \cdot H}$$

$$H = \left[\frac{(L+V)}{2|V+L|}\right]$$

where N, L and V are a surface normal vector, a light-source incidence vector (unit vector) and a view vector (unit vector), respectively. H is a half vector between the light-source incidence L and view vector V. λ is a wave-length of light-source incidence. θ is an angle between light-source incidence L and surface normal vector N, and α is an angle between a mirror reflection vector and the view vector. ρ(λ,θ) shows a function of reflectance, and D(α) denotes a reflection distribution function.

A geometrical attenuation factor G is expressed by vectors and defined with a minimum value among three values in equation (1). The diffuse light reflection cos θ, cos α and cos γ (inner-product of surface normal N and view vector V) are defined by the equations (2)-(4) respectively.

$$\cos \theta = L \cdot N \quad (2)$$

$$\cos \alpha = (2 \cdot N \cdot (L \cdot N) - L) \cdot V \quad (3)$$

$$\cos \gamma = N \cdot V \quad (4)$$

Substituting the equations (2)-(4) for the equation (1), the specular reflection component; Ispec is obtained as shown in an equation (5).

$$Ispec = 2k \cdot \rho(\lambda, \theta) \cdot D(\alpha) \cdot \min\left[\frac{1}{2\cos\gamma}, \frac{\cos\alpha}{\cos\gamma}, \frac{\cos\alpha}{\cos\theta}\right] \quad (5)$$

Figure 5:
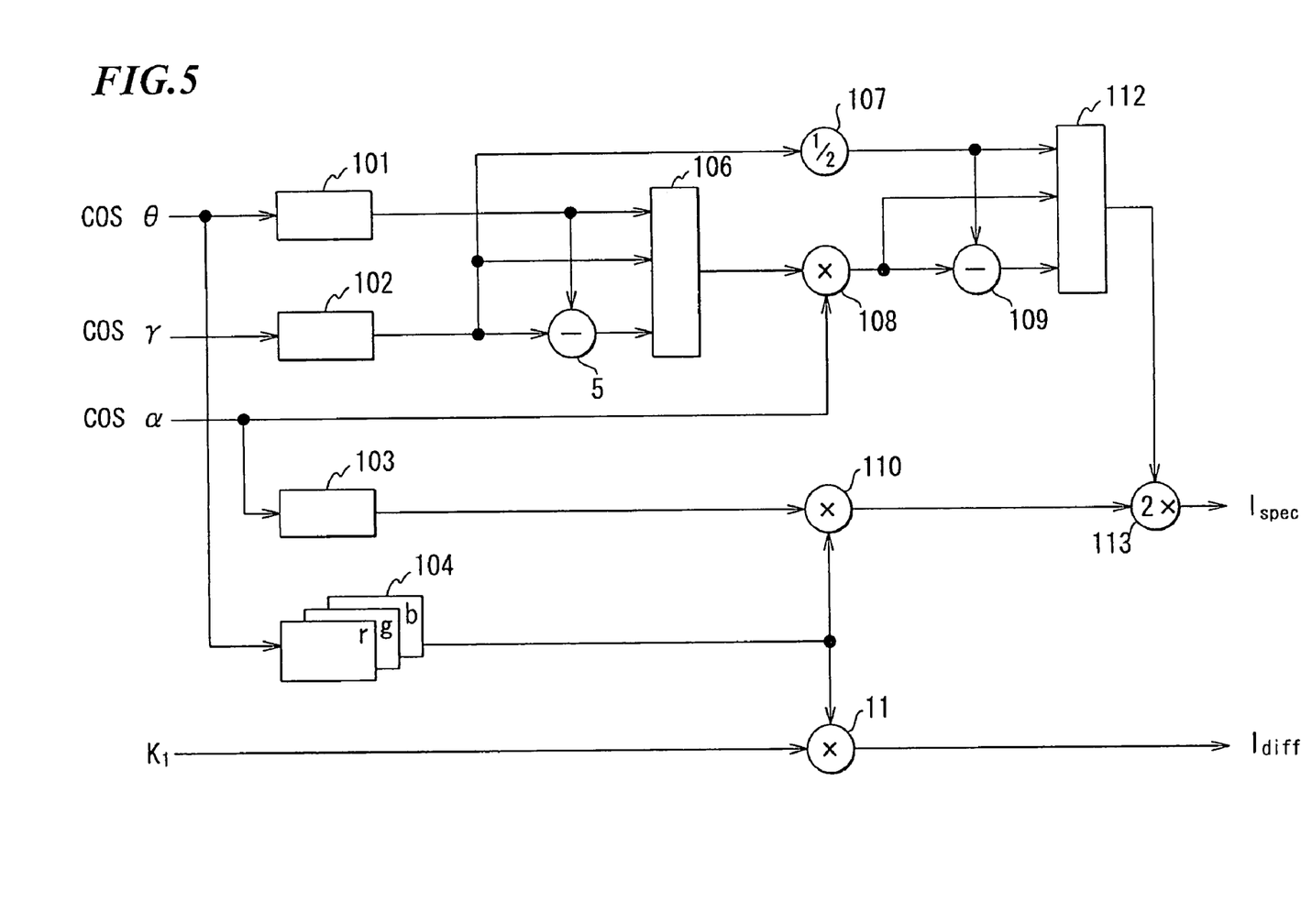
FIG. 5 is a block diagram of the circuit published in Japanese laid open patent No. 2003-30683

Japanese laid open patent No. 2003-30683, reference 1, discloses the circuit to get the specular reflection component Ispec on a rough surface. FIG. 5 shows the brief circuit-diagram proposed on the Japanese laid open patent No. 2003-30683, implementing a table 101 of 1/cos θ, a table 102 of 1/cos γ, a table 103 of D(cos α), a table 104 of k×ρ(λ, cos θ), subtracter 105, multiplexer 106, ½ shifter 107, multiplier 108, comparator 109, multiplier 110, multiplier 111, multiplexer 112, multiplier that outputs two-time shifted value 113 respectively.

This circuit selects the minimum value from reciprocal values of cos γ and cos θ using ½ shifter 107, multiplier 108, multiplexers 106 and 112 through tables 101 and 102. However, the equation (5) takes the ranges from zero to infinity, resulting in low accuracy both for the minimum value of the geometrical attenuation factor and the specular reflection component.

The anisotropic reflection expresses a specific intensity distribution of specular reflection on object surfaces e.g., CD-ROM, hair, clothes, metals, which are caused by the grooves on a surface. As a computer graphics scheme to render the anisotropic reflection, the surface must be represented by polygon vertices with surface tangents that imply the direction of grooves in addition to the surface normal, light-source incidence and view angles. The anisotropic reflection is obtained by interpolating the above variables on a polygon interior. This scheme, however, assumes that the reflectance distributes uniformly on the whole surface.

The above assumption is available if the surface groove lines are in a single direction. However, the anisotropic reflection cannot be expressed properly in the case of, e.g., clothes that cross complex textures, unless the surface is divided into polygons of a small size. If the number of polygon increases, the workload for computing becomes heavy. Furthermore, a realistic expression cannot be obtained without a large number of small polygons on surfaces such as Makie (gold lacquer ware) on paintings and various reflectances of gold and silver leaves.

SUMMARY OF INVENTION

The object of the present invention is to provide a specular reflection circuit with high computing accuracy.

The other object of the present invention is to provide a specular reflection circuit which can be implemented by means of small-scaled hardware.

The other object of the present invention is to provide a specular reflection circuit which can be implemented by a multimedia processor.

The other object of the present invention is to provide hardware such as a computer which embeds the above described specular reflection circuit.

The other object of the present invention is to provide a circuit, especially a computer graphics circuit, to render an anisotropic reflection surface with a light computing workload.

The other object of the present invention is to provide a circuit, especially a computer graphics circuit, to render the surface involving anisotropic reflection and multiple reflectance.

The other object of the present invention is to provide image-rendering devices that comprise such a circuit as described above.

[1] The first embodiment of the present invention, for solving the above one or more objects, is directed to the circuit to compute a reflection intensity on a rough surface defining: a surface normal vector N, a light-source incidence vector L, a view direction vector V, a half-vector H between L and V, $N \cdot L = \cos \theta$, $N \cdot V = \cos \gamma$, $V \cdot H = \cos \phi$, $N \cdot H = \cos \beta$, and comprising:

a means for storing reflectance as a function of $\phi$ or $\cos \phi$;

a means for storing a reflection distribution term as a function of $\beta$ or $\cos \beta$;

a means for obtaining a reflectance term ($F_\lambda(\phi)$) from the means for storing reflectance using $\phi$ or $\cos \phi$ as an index;

a means for obtaining a distribution function (D'($\beta$)) from the means for storing reflection distribution term using $\beta$ or $\cos \beta$ as an index;

a means for obtaining the value of max[0.5 cos θ cos φ, 0.5 cos φ cos γ, cos θ cos β cos γ], which is a maximum value among 0.5 cos θ cos φ, 0.5 cos φ cos γ and cos φ cos β cos γ;

a means for obtaining a geometrical attenuation factor (G'($\beta$, $\theta$, $\gamma$, $\phi$)) of the reflected component by computing the reciprocal of the max[0.5 cos θ cos φ, 0.5 cos φ cos γ, cos θ cos β cos γ]; and a means for obtaining a reflection intensity using the terms of reflectance ($F_\lambda(\phi)$), reflection distribution function (D'($\beta$)) and geometrical attenuation factor (G'($\beta$, $\theta$, $\gamma$, $\phi$)).

[2] The first embodiment of the present invention, for solving the above one or more objects, is also directed to a circuit that defines the intensity of reflectance on a rough surface using reflectance, a light reflection distribution function and light a attenuation factor as a means for obtaining a reflectance component of the reflectance using a reflectance term expressed by the intensity ratio of light incidence and reflection, a distribution function term on the surface of a microfacet orientation that is a set of minute surfaces of an object, and a geometrical attenuation factor to express the attenuation on the microfacet surface that occurs as a partial shield of the light incidence and reflection ray, comprising:

a first means for computing a reflectance term using an inner-product of a light-source incidence vector and a view vector;

a second means for computing a distribution function by multiplying a half-vector between light-source incidence and the view vector with normal on-object surface;

a third means for selecting a maximum value from multiplied inner-products using the surface normal vector, the light-source incidence vector, the view vector and the half vector;

a fourth means for computing a geometrical attenuation factor from the reciprocal of said maximum value obtained by the third means; and a means for obtaining a reflection component by multiplying a reflectance term, a distribution function factor and a geometrical attenuation factor.

[3] To solve the above one or more object, the rendering device of light reflection of the present invention comprises the circuit described in the above paragraphs [1] or [2].

[4] The second embodiment of the present invention, for solving the above one or more objects, is directed to the circuit that computes a reflection intensity, for calculating a reflection intensity of a computer graphics image, defining the object surface by a set of polygons that have both or either microscopic grooves or partial areas of different reflectance, comprising:

a means for obtaining a surface normal vector N at every polygon vertex;

a means for obtaining a light-source incidence L at every polygon vertex;

a means for obtaining a view vector V at every polygon vertex;

a means for obtaining a texture mapping address (U,V) at every polygon vertex;

a means for interpolating the values of the surface normal vector N, the light-source incidence vector L, the view vector V and the texture mapping address (U,V) on a polygon interior;

a means for reading a surface tangent vector Ti using the interpolated texture mapping address from memory that stores the surface tangent vector Ti that is addressed by an interpolated texture mapping address; and a means for computing a light-reflection intensity at each interpolated point of a polygon interior using an interpolated value of surface tangent Ti, interpolated value of surface normal vector Ni, interpolated value of light-source incidence vector Li and an interpolated value of view vector Vi.

[5] Preferably, the second embodiment of the present invention is directed to the circuit that computes a light-reflection intensity as recited in the above paragraph [4], wherein the texture pattern is separately stored with three color components of red, green and blue in connection with the interpolated texture mapping address; and where blended reflection intensity is computed using the reflectance intensity computed by the circuit as recited in paragraph [1], and the texture pattern in connection with the three color-components of red, green and blue.

[6] Preferably, the second embodiment of the present invention is directed to the circuit that computes light-reflection intensity as recited in the above paragraph [4], wherein cos θ is defined as an inner-product of said surface normal vector N and light-source incidence vector L, the means for computing a light-reflection intensity comprising:

a means for storing and reading a light-attenuation factor S(θ) addressed by θ or cos θ;

a means for storing and reading a specular reflectance ρs addressed by θ or cos θ;

a means for storing and reading a diffuse reflectance ρd or cos θρd, addressed by θ or cos θ;

a means for storing and reading a reflection distribution function (D(φ)) addressed by function (φ) that is derived from the interpolated light-source incidence vector Li, the interpolated view vector Vi and the interpolated surface tangent vector Ti;

a means for multiplying; and a means for adding.

[7] Preferably, the second embodiment of the present invention is directed to the circuit that computes light-reflection intensity as recited in the above paragraph [6], wherein the value of the specular reflectance ρs stored and read by a means for storing and reading specular reflectance ρs is separately stored and read with separated wavelength (of original color) of red, green and blue.

[8] Preferably, the second embodiment of the present invention is directed to the circuit that computes light-reflection intensity as recited in the above paragraph [6], wherein the value of the diffuse reflectance ρd or cos θρd stored and read by a means for storing and reading a diffuse reflectance ρd or cos θρd addressed by θ or cos θ are separately stored and read by separated wavelength (of original color) of red, green and blue.

[9] Preferably, the second embodiment of the present invention is directed to the circuit that computes a light-reflection intensity as recited in the above paragraph [6], wherein the function (φ) that relates to the interpolated light-source incidence vector Li, the interpolated view vector Vi and the interpolated surface tangent vector Ti fulfill the following equation:

$$\phi = \pi/2 - \cos^{-1}(T \cdot H)$$

where Hi is a half-vector of interpolated light-source incidence Li and view vector Vi, and T·H is an inner-product of Hi and Ti.

[10] Preferably, the second embodiment of the present invention is directed to the circuit that computes light-reflection intensity as recited in the above paragraph [4], wherein a reflection intensity Ip is computed with the following equation:

$$Ip = \cos\theta \rho d + \rho s\, S(\theta) D(\phi)$$

where Ip is a reflection intensity, $S(\theta)$ is light attenuation factor, $\rho s$ is specular reflectance, $\rho d$ is diffuse reflectance and $D(\phi)$ is a reflection distribution function.

[11] The image rendering device of the present invention for solving the above one or more objects, is directed to an image rendering device that comprises the circuit described any one of the above paragraphs [4]-[10].

[12] The second embodiment of the present invention, for solving the above one or more objects, is directed to a compound anisotropic circuit, relating a computer graphics circuit for expressing light reflectance on the object surface including microscopic grooves and various reflectance, defining the object surface by a set of polygons, defining a surface normal, a light-source incidence vector, a view vector and a texture mapping address at each polygon vertex, comprising:

a means for defining a surface tangent vector that indicates the direction of the groove at every interior point, storing the surface tangent of two-dimensional array into memory, a means for interpolating the surface normal vector, the light-source incidence vector, the view vector and the texture mapping address, reading the surface tangent from the memory assigned with texture mapping address, and computing a light reflection intensity by using the surface tangent vector, interpolated surface tangent vector, interpolated light-source incidence vector and interpolated view vector.

[13] Preferably, the second embodiment of the present invention is directed to a compound anisotropic circuit as recited in the above paragraph [12], wherein a light intensity of interpolated points are determined using:

a means for reading four or more surface tangents centering around texture mapping address points from memory circuit, filtering the surface tangents and determining the filtered surface vector as a required surface tangent vector at the mapping address point;

a means for calculating an inner-product of half-vector, which is defined by the view vector and the light-source incidence, and a surface normal vector, and implementing a light reflection distribution function table addressed by the inner-product of the half-vector and the surface normal vector; and a means for implementing a light attenuation function table addressed by the angle between the half vector and the surface normal vector.

[14] Preferably, the second embodiment of the present invention is directed to a compound anisotropic circuit as recited in the above paragraph [12], wherein further comprising;

a means for implementing a reflectance table to store the reflectance at wavelengths of red, green and blue, and deriving a read address for the reflectance table from the surface normal, the light-source incidence vector and the view vector;

a means for storing two or more sets of reflectance in the reflectance table in correspondence with the number of reflectance defined on a single polygon surface, further storing a reflectance selection bit in the memory circuit to select said reflectance from reflectance table during interpolation, and defining the selection-bit per point of polygon interior in a two-dimensional pattern; and a means for reading the reflectance selection bit from the memory circuit using interpolated texture mapping address of paragraph [12], and selecting a proper reflectance using both reflectance selection-bit and the read address of the reflectance table.

The surface normal vector N is a unit vector defined at each polygon surface regarding object with a set of polygons. The light-source incidence vector L is a unit vector of light-ray which directs to the polygon vertex from light-source. The view vector V is a unit vector having a direction from eye-point to each polygon vertex.

The circuit of the first embodiment of the present enables computation of a specular reflection component in small scaled circuit with high precision because the reciprocal of a trigonometric function allows a reduction of the number of computation and to carry out the processing at a final stage.

The circuit of the second embodiment of the present invention allows the circuit (appropriate for renderer in computer graphics) to render the surface of anisotropic reflection property with a light workload.

The circuit of the second embodiment of the present invention further can allows the circuit (appropriate for renderer in computer graphics) to render both surfaces of anisotropic reflection and multiple reflection.

The present invention can provide the image rendering devices comprising the above circuits.

DETAILD DESCRIPTION OF THE PREFERRED IMPLEMENTATION

1. The First Embodiment of the Present Invention

The first embodiment of the present invention is directed to a circuit to compute a light-reflection for a rough surface object in computer graphics systems. The first embodiment specifies the circuit to structure specular reflection component modified by the formula from Cook-Torrance representation. Cook-Torrance representation for specular reflection is given by the following equation (6):

$$Rs = F_\lambda(V, L) \cdot \frac{D(V, L) \cdot G(V, L)}{(N \cdot L)(N \cdot V)} \qquad (6)$$

$$G = \min[1, Gs, Gm],$$

$$Gs = \frac{2(N \cdot H)(N \cdot L)}{V \cdot H},$$

$$Gm = \frac{2(N \cdot H)(N \cdot V)}{V \cdot H}$$

-continued $$H = \left[\frac{(L+V)}{2|V+L|}\right]$$

where N is a surface normal vector, L is a light-source incidence vector, V is a view (unit) vector, H is a half-vector between light-source incidence vector L and view vector V, $F_\lambda(V,L)$ is a reflectance term represented by wave length on the basis of a Fresnel function, D(V,L) is a light reflection distribution function defined by Beckman's function, and G(V,L) is a geometrical attenuation factor for self-shadow on a microfacet surface. This invention defines inner-products of vectors as follows:

$$\cos \theta = N \cdot L \quad (7)$$

$$\cos \gamma = N \cdot V \quad (8)$$

$$\cos \phi = V \cdot H \quad (9)$$

$$\cos \beta = N \cdot H \quad (10)$$

Substituting the equation (7)-(10) to the equation (6), a light-reflection Ispec is obtained as shown in equation (11).

$$Ispec = F_\lambda(\phi) \cdot D'(\beta) \cdot G'(\beta, \theta, \gamma, \phi) \quad (11)$$

$$D'(\beta) = \cos\beta \cdot D(\beta)$$

$$G'(\beta, \theta, \gamma, \phi) = \frac{1}{\max[\cos\beta\cos\theta\cos\gamma, 0.5\cos\theta\cos\phi, 0.5\cos\gamma\cos\phi]}$$

1.1. Basic Configuration of the First Embodiment of the Present Invention

Figure 1:
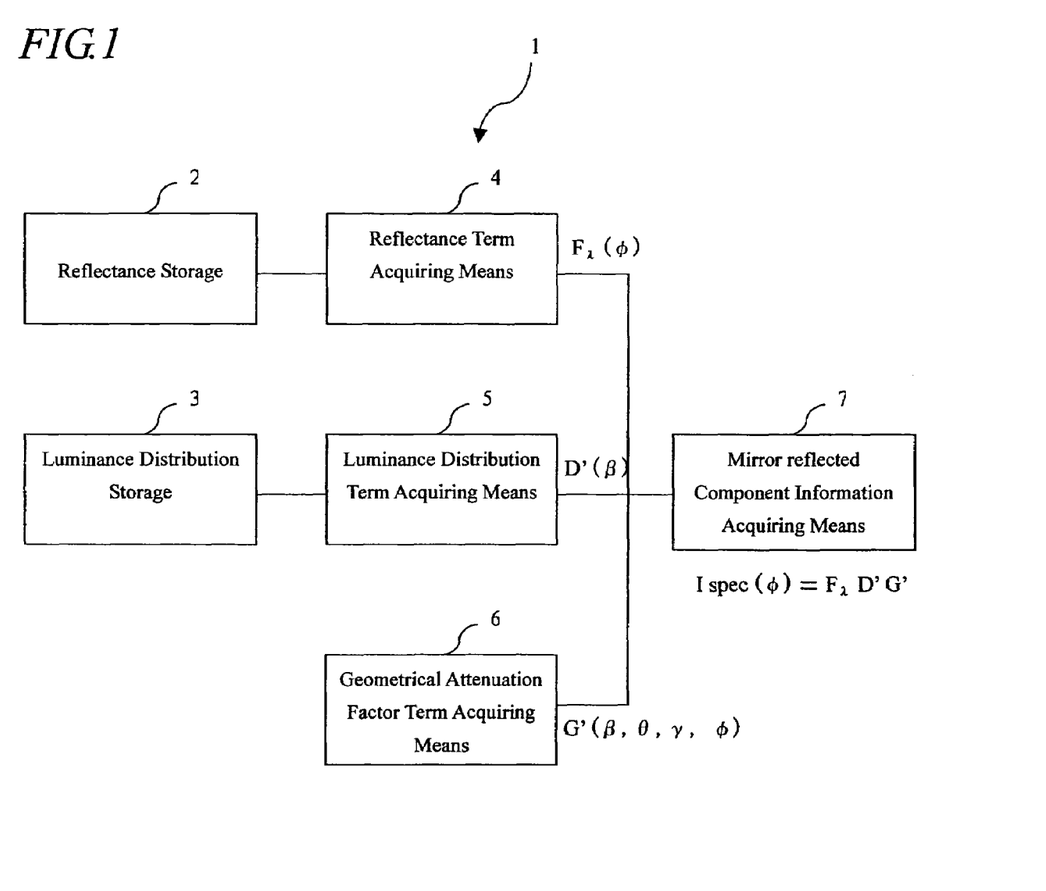
FIG. 1 is a block diagram of the circuit relating to the first embodiment of the present invention.

The first embodiment of the present invention is explained with reference to FIG. 1. FIG. 1 shows a block diagram of a circuit for the first embodiment of the present invention. As shown in FIG. 1, the circuit of the first embodiment of the present invention is the circuit 1 to compute a specular reflection component on rough surface, comprising:

a means 2 for storing reflectance;
a means 3 for storing a reflection distribution term;
a means 4 for obtaining a reflectance term ($F_\lambda(\phi)$), which is one of the specular reflection components;
a means 5 for obtaining a distribution function ($D'(\beta)$), which is one of the specular reflection components;
a means 6 for obtaining a geometrical attenuation factor ($G'(\beta, \theta, \gamma, \phi)$) which is one of the specular reflection components; and
a means for obtaining a reflection intensity using the terms of reflectance ($F_\lambda(\phi)$), the reflection distribution function ($D'(\beta)$) and the geometrical attenuation factor ($G'(\beta, \theta, \gamma, \phi)$).

Comprising the above means, the circuit of the first embodiment of the present invention can obtain the information of equation (11) relating to specular reflection component.

1.2. A Means for Storing Reflectance Term

The means 2 for storing a reflectance term stores reflectance of an object as a function of $\phi$ or cos $\phi$p. The reflectance ($F_\lambda(\phi)$) denotes the ratio of reflection to incidence of light. A memory table is used to store the reflectance, which is addressed by $\phi$ or cos $\phi$. The reflectance for rendering an object may be obtained by an actual measurement or a theoretical value and shall be stored with wavelengths at red, green and blue.

1.3. A Means for Storing Distribution Function

The means 3 for storing a distribution function stores the distribution as a function of β or cos β. The distribution function is specified by the surface slope at a microfacet and stores the distribution of light reflection (D'(β)).

A (D'(cos β)) is definable by multiplying D (cos β) by cos β, which D (cos β) is given by, e.g., Gaussian function, Beckman's function or $\cos^n \beta$. The memory to store D'(cos β) addressed by cos β is an example of this invention.

1.4. A Means for Obtaining Reflectance

The means 4 for obtaining reflectance specifies the scheme to obtain the reflectance term ($F_\lambda(\phi)$) in a specular reflection component by storing the reflectance term ($F_\lambda(\phi)$) into memory and reading it from said memory addressed by cos $\phi$.

1.5. A Means for Obtaining Distribution Function

The means 5 for obtaining a distribution function specifies the scheme to obtain the distribution function D' (β) in a specular reflection component by storing the distribution function D' (β) into memory and reading it from said memory addressed by cos β.

1.6. A Means for Obtaining Geometrical Attenuation Factor

The means 6 for obtaining a geometrical attenuation factor specifies the scheme to obtain the geometrical attenuation factor G'(β, θ, γ, $\phi$) by computing the reciprocal of G' and selecting a maximum value among the reciprocal terms; 0.5 cos θ cos $\phi$, 0.5 cos $\phi$ cos γ and cos θ cos β cos γ. A trigonometric function can be computed with relatively high accuracy. This invention can obtain the specular reflection factor in a small scaled circuit and with high accuracy due to the use of a reciprocal after computing trigonometric function. A memory table shall be used for obtaining the reciprocal.

1.7. A Means for Obtaining Specular Reflection Component

The means 7 specifies the specular reflection component with the reflectance term ($F_\lambda(\phi)$), the distribution function D'(β) and the geometrical attenuation factor G'(β, θ, γ, $\phi$). The specular reflection component is obtained by multiplying ($F_\lambda(\phi)$), D' (β) and G'(β, θ, γ, $\phi$).

2. Operation

The operations for the circuit of the first embodiment of the present invention are described as follows:

the means 4 for obtaining reflectance specifies the operation to obtain the reflectance term $F_\lambda(\phi)$ in a specular reflection component by means of storing the reflectance term addressed by $\phi$ or cos $\phi$;

the means 5 for obtaining distribution function specifies the operation to obtain the distribution function D'(β), one of specular reflection components, by means of storing a distribution function addressed by β or cos β;

the means 6 for obtaining a geometrical attenuation factor specifies the operation to obtain the geometrical attenuation factor $G'(\beta, \theta, \gamma, \phi)$, one of the specular reflection components, from the reciprocal of max [0.5 cos $\theta$ cos $\phi$, 0.5 cos $\phi$ cos $\gamma$, cos $\theta$ cos $\beta$ cos $\gamma$] after obtaining the maximum value of 0.5 cos $\theta$ cos $\phi$, 0.5 cos $\phi$ cos $\gamma$ and cos $\theta$ cos $\beta$ cos $\gamma$; and the means 7 for obtaining a specular reflection component specifies the operation to obtain the specular reflection component Ispec from the values of reflectance term ($F_\lambda(\phi)$), the distribution function $D'(\beta)$ and the geometrical attenuation factor $G'(\beta, \theta, \gamma, \phi)$.

3. The Second Embodiment of the Present Invention: Brief Description of the Reflection Intensity Circuit.

Figure 2:
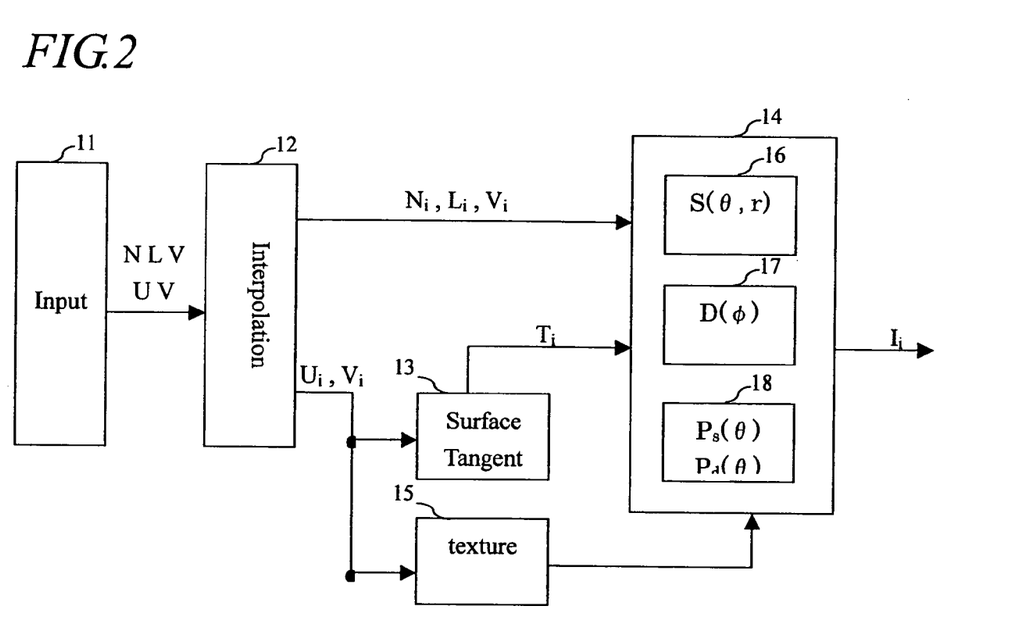
FIG. 2 is a block diagram of the circuit that computes light-reflection intensity relating to the second embodiment of the present invention.

FIG. 2 shows the reflection intensity circuit of the second embodiment of the present invention. As shown in FIG. 2, the reflection intensity circuit of the present invention calculates a reflection intensity of a computer graphics image, defining the object surface by a set of polygons that have both or either microscopic grooves or partial areas of different reflectance, and comprises:

a means 11 for obtaining a surface normal vector N, a light-source incidence L, a view vector V, and a texture mapping address (U,V) at every polygon vertex;

a means 12 for interpolating the values of the surface normal vector N, the light-source incidence vector L, the view vector V and the texture mapping address (U,V) on polygon interior;

a means 13 for reading a surface tangent vector Ti using the interpolated texture mapping address, from memory that stores the surface tangent vector Ti that is addressed by interpolated texture mapping address; and a means 14 for computing a light-reflection intensity at each interpolated point of a polygon interior using an interpolated value of surface tangent Ti, an interpolated value of surface normal vector Ni, an interpolated value of light-source incidence vector Li and an interpolated value of view vector Vi.

The reflectance intensity circuit of this embodiment, as shown in FIG. 2, preferably further comprises a means 15 for storing a texture pattern in connection with an interpolated texture mapping address (Ui,Vi), and for reading the texture pattern using the interpolated texture mapping address (Ui, Vi).

3.1. A Means for Input

The means 11 for obtaining a surface normal vector N, a light-source incidence L, a view vector V, and a texture mapping address (U,V) at every polygon vertex, specifies to input the surface normal vector N at each polygon vertex, the light-source incidence vector L at each polygon vertex, the view vector V at each polygon vertex and a texture mapping address (U,V) at each polygon vertex. These values may be defined previously in relation with the objects, and then the defined values are inputted.

3.2. A Means for Interpolation

The means 12 for interpolation specifies the polygonal interpolation for the surface normal vector N, the light-source incidence vector L, the view vector V and the texture mapping address (U,V), which are defined at each polygon vertex. The conventional interpolation schemes are applicable. One example of the means for interpolation consists of polygon-outline and span processing. The polygon-outline interpolation is carried out between polygon vertices, while the span interpolation is carried out between the horizontal two points obtained by the polygon-outline interpolation.

3.3 A Means for Storing Surface Tangent Vector

The means 13 for storing a surface tangent vector specifies storing and reading of a surface tangent Ti using an interpolated texture mapping address. The surface tangent designates the direction of minute grooves on the surface for the vector.

In the means for storing a surface tangent vector, four or more surface tangents are read centering around the interpolated texture mapping address (Ui,Vi) and produce a filtered surface tangent. The preferable numbers of surface tangents to read are four or 16. The surface tangent T is stored in the format of a three-dimensional vector or polar coordinate angle. The filtering reduces the alias caused by a single sampling at a mapping address due to the computation error of interpolation between positions of the polygon vertex and the mapping address (U,V).

The filtering of this invention allows general schemes as used for texture pattern colors. The linear or bi-linear filtering uses vectors sampled in 2×2 areas centering around a mapping address, while the cubic filtering uses 4×4 areas. A vector-normalization shall be applied after said filtering.

3.4. A Means for Computing Reflection Intensity

The means 14 for computing a reflection intensity specifies a processing to compute a reflection-intensity at every interpolated point of a polygon interior using an interpolated surface tangent vector Ti, an interpolated surface normal vector Ni, an interpolated light-source incidence vector Li and an interpolated view vector Vi.

The means 14 for computing a reflection intensity, preferably comprises a means 16 for storing and reading a light-attenuation factor $S(\theta)$ addressed by $\theta$ or cos $\theta$, wherein cos $\theta$ is a inner-product of the surface normal vector N and the light-source incidence vector L;

a means 18 for storing and reading a specular reflectance $\rho s$ addressed by $\theta$ or cos $\theta$;

a means 18 for storing and reading a diffuse reflectance $\rho d$ or cos $\theta \rho d$, addressed by $\theta$ or cos $\theta$;

a means 17 for storing and reading a reflection distribution function ($D(\phi)$) addressed by function ($\phi$) that is derived from the interpolated light-source incidence vector Li, the interpolated view vector Vi and the interpolated surface tangent vector Ti;

a means for multiplying which is not shown in FIG. 2; and a means for adding which is not shown in FIG. 2.

The diffuse reflectance term $\rho d$, specular reflectance term $\rho s$, intensity attenuation factor $S(\theta, \gamma)$ and distribution function $D(\phi)$ are preferably stored into RAM tables. The function $\phi$ is preferably stored into ROM or RAM. Preferably, the RAM is refreshed if the value m of function $D(\phi)$ varies. The $S(\theta, \gamma)$ is approximately replaceable to $S(\theta)$.

The circuit of this embodiment reads the interpolated values of the diffuse reflectance term $\rho d$, the specular reflectance term $\rho s$, the attenuation factor $S(\theta)$, and the distribution function $D(\phi)$ at every interpolated point. Thus, the reflectance is read in connection with the interpolated values, which enables the circuit to render the reflection varied per polygon-interior point.

The preferred embodiment of the circuit of the second embodiment of the present invention multiplies and adds each of the interpolated diffuse reflectance term $\rho d$, the specular reflectance term $\rho s$, the intensity attenuation factor $S(\theta)$, and the distribution function D(φ). Reflection intensity (for anisotropic reflection) Ip is preferably given by the following equation;

$$Ip = \rho d(N \cdot L) + \rho s\, S(\theta) D(\phi).$$

The specular and diffuse reflectance terms stored and read by the means 14 shall be stored and read in the form of wave-length at red, green and blue respectively, thus, said Ip represents the intensity of every red, green and blue component.

The function φ derived from light-source incidence Li, view vector Vi and surface tangent Ti shall be defined by the following equation using the half-vector of light-source incidence Li and view vector Vi and the inner-product T·H of surface tangent Ti and said half-vector Hi:

$$\phi = \pi/2 - \cos^{-1}(T \cdot H).$$

3.5. The Means for Reading Texture Pattern

The means 15 for reading a texture pattern is a means for storing the texture pattern addressed by interpolated texture mapping address (Ui,Vi), and a means for reading the texture pattern addressed by interpolated texture mapping address (Ui,Vi). This embodiment of the present invention, the texture pattern is read with a reference of an interpolated texture mapping address (Ui,Vi). In this embodiment of the present invention specifies that the diffuse reflectance term ρd (or cos θρd), the specular reflectance term ρs, the attenuation factor S(θ), the distribution function D(φ) as well as the texture pattern are read by the interpolated texture mapping address (Ui,Vi). Therefore, the circuit of this embodiment can provide a circuit that renders a realistic image with a relatively small scaled hardware workload.

The texture pattern shall store and read each color component of red, green and blue separately and address each by interpolated texture mapping address (Ui,Vi).

3.6 Equation for Anisotropic Reflection

The computation for anisotropic reflection in the embodiment of this invention is shown in the following equation;

$$\begin{cases} Ip = \rho d \cdot (N \cdot L) + \rho s \cdot S(\theta, \gamma) \cdot D(\phi) \\ \phi = \pi/2 - \cos^{-1}(T \cdot H) \\ D(\phi) = \exp\{-(\tan\phi/m)^2 / 4m^2 \cos^4 \phi \end{cases} \quad (12)$$

where Ip, ρd, ρs, S(θ,γ), H and m in the equation (12) denote reflection intensity, a diffuse reflectance term, a specular reflectance term, an attenuation factor, a half-vector of light-source incidence vector L and view vector V, and a surface roughness, respectively. The surface normal N, light-source incidence vector L and view vector V defined at each polygon vertex are interpolated at every interior point. A half-vector H is derived by light-source incidence and view vector of each interpolated point. The surface tangent vector T is read from the memory by the texture mapping address. The surface tangent vector T is defined with either vector components of three-dimension or polar coordinate.

With this background, an alias, or a jaggy, might happen due to the computation error between mapping address (U,V) and coordinate of polygon vertex. To reduce the alias, the filtering shall be applied, which is often used for the texture pattern colors. A linear or bi-linear filtering uses the vectors in 2×2 areas centering around the mapping address, and a cubic filtering uses the vectors in a 4×4 area. The second embodiment applies to the surface tangent a vector-normalization after filtering.

An empirical model generally defines the reflectance ρd and ρs constant, which are available for objects with uniformly distributed reflectance. However, the interpolated points might have multiple reflectances in the case that the object is composed of different materials. The reflectance is a unique characteristic of material and alternates according to the wave-length and light-source incidence to the surface. The second embodiment stores the reflectance ρd and ρs into a RAM table in advance. Because the reflectance depends on the light-source incidence, the inner-product (N·L) of surface normal N and light-source incidence L is used for the address for the RAM table to read. Equation (13) shows the above relation.

$$Ip = \rho d(\lambda_{r,g,b},\theta) \cdot (N \cdot L) + \rho s(\lambda_{r,g,b},\theta) \cdot S(\theta,\gamma) \cdot D(\phi) \quad (13)$$

where $\rho d(\lambda_{r,g,b},\theta)$ and $\rho s(\lambda_{r,g,b},\theta)$ are the reflectance as a function of angle θ between surface normal N and light-source incidence L, and wave-length at red, green and blue. The second embodiment of this invention can replace θ to β which is obtained by inner-product (N·H) of surface normal N and half-vector H as shown in equation (14).

$$\cos \beta = N \cdot H = N \cdot [(L+V)/2|L+V|] \quad (3)$$

In the case of distributing multiple reflectances on materials and storing a single set of reflectance in said RAM table, the table content has to be swapped for every material during interpolation. This swap-processing is not practical considering the time-cost of loading. The second embodiment of the present invention stores the necessary numbers of reflectance into a RAM table in advance. The bit-length to select appropriate reflectance from the table is n if the RAM table can store $2^n$ sets of reflection. The N is distributed in a two-dimensional array which is the same as the texture pattern. The N bit is attached to the texture pattern color bit. Thus, this invention can select the appropriate reflectance of material using n-bit for upper bit-field (lower bit-field is said θ) of the RAM table address. This reflectance denotes $\rho d(\lambda_{r,g,b},\theta)$ and $\rho s(\lambda_{r,g,b},\theta)$ of equation (9).

As described above, the second embodiment of the present invention specifies the means to obtain the reflection intensity on the surface which has grooves and multiple reflectances in a single polygon interior, defining the surface tangent per pixel, which has the same distribution as the texture pattern, reading and selecting the unique object-reflectance per pixel with the selection bit which is memorized in advance.

EXAMPLE 1

Figure 3:
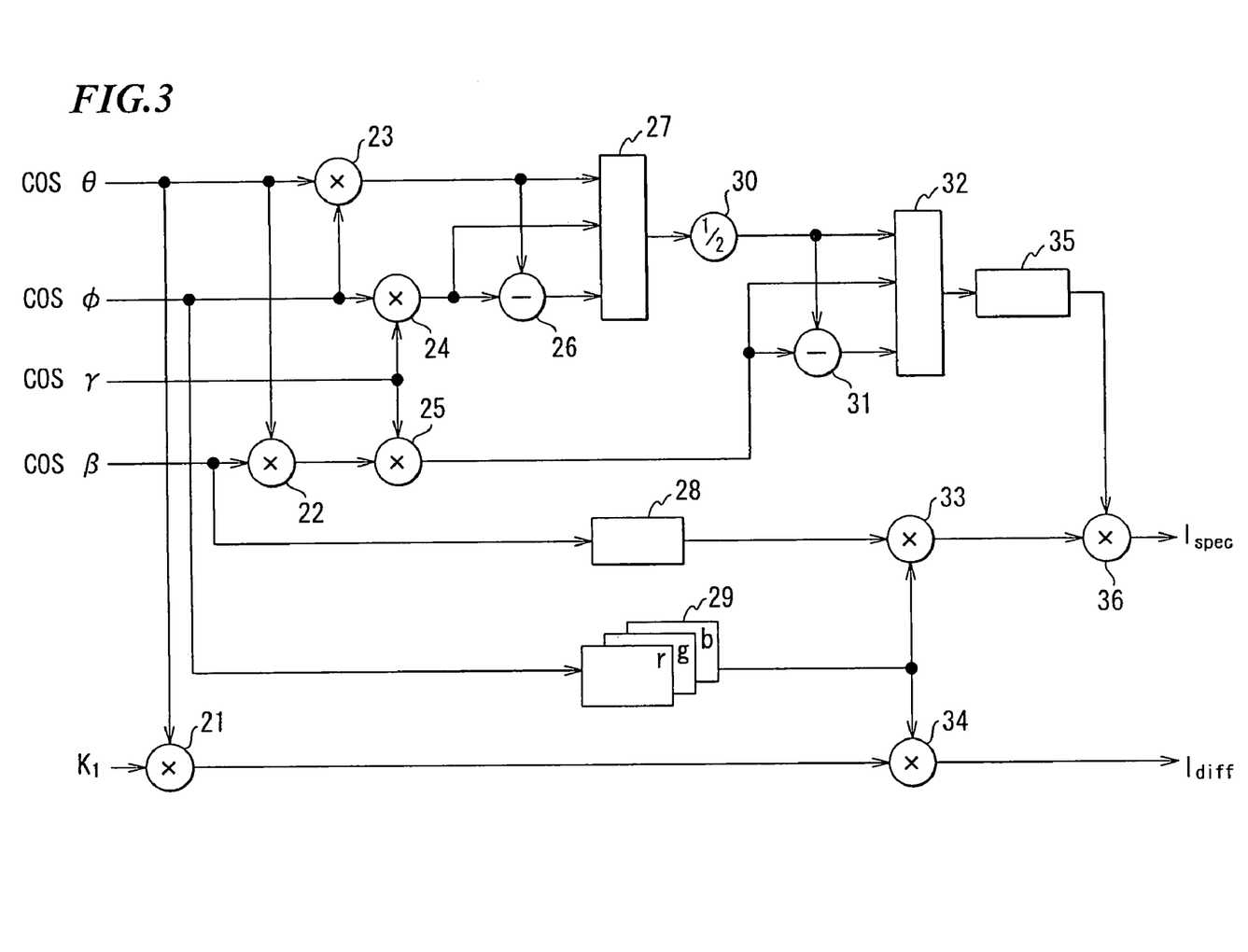
FIG. 3 is a block diagram of the circuit relating example 1.

The example 1 of the present invention is explained with reference to FIG. 3. FIG. 3 shows a block diagram of example 1. In FIG. 3, 21-25 denotes multipliers, 26 denotes a subtractor, 27 denotes a multiplexer, 28 denotes a D'(cos β) table, 29 denotes a $F_\lambda$(cos φ) table, 30 denotes a ½ shifter, 31 denotes a subtractor, 32 denotes a multiplexer, 33 and 34 denote multipliers, 35 denotes a reciprocal table and 36 denotes a multiplier. The specular reflection component of this invention is represented by the equation (11).

$$Ispec = F_\lambda(\phi) \cdot D'(\beta) \cdot G'(\beta, \theta, \gamma, \phi) \quad (11)$$

$$D'(\beta) = \cos\beta \cdot D(\beta)$$

$$G'(\beta, \theta, \gamma, \phi) = \frac{1}{\max[\cos\beta\cos\theta\cos\gamma,\, 0.5\cos\theta\cos\phi,\, 0.5\cos\gamma\cos\phi]}$$

$F_\lambda$(cos φ) table 29 stores the reflectance of each color component of red, green and blue. The reflectance term $F_\lambda(\phi)$ is, for example, stored in the table, using the measurement values sampling at every color component. $F_\lambda(\phi)$ is read by cos φ. Thus, $F_\lambda$(cos φ) table 29 stores the value of $F_\lambda$(cos φ) which is a modified value of the reflectance.

D'(cos β) table 28 stores the distribution function, which is practically defined by, e.g., a Gaussian function, a Beckman function, $\cos^n β$, or D'(cos β) which is a multiplied value of these values and cos β. D'(cos β) table is read by cos β. The reciprocal table 35 stores the reciprocal, which ranges from 0 to 1. As for the reciprocal table 35, RAM as well as ROM (read only memory) is used.

As shown in FIG. 3, the circuit receives the values of cos θ, cos φ, cos γ and cos β. The diffuse reflection coefficient $K_1$ may be applied in case of computing diffuse reflection component $I_{diff}$.

Cos θ and cos β are applied to multiplier 22. The multiplier 22 outputs the result of cos θ cos β to multiplier 25. Cos θ and cos φ are applied to multiplier 23. The multiplier 23 outputs the result of cos θ cos φ to subtractor 26 and multiplexer 27.

Cos φ and cos γ are applied to multiplier 24. The result cos φ cos γ is applied to subtractor 26 and multiplexer 27. The cos θ cos β and cos γ are applied to multiplier 25 which results in cos θ cos β cos γ. The cos θ os β cos γ is applied to subtractor 31 and multiplexer 32.

The subtractor 26 subtracts cos θ cos φ from cos φ cos γ. The result is applied to the multiplexer 27 in order to choose the larger value of cos θ cos φ or cos φ cos γ. Max[cos θ cos φ, cos φ cos γ] is applied to ½ shifter 30 in order to multiply 0.5 by max[cos θ cos φ, cos φ cos γ]. The value of 0.5 max[cos θ cos φ, cos φ cos γ] is applied to the subtractor 31 and the multiplexer 32.

The subtractor 31 subtracts 0.5 max[cos θ cos φ, cos φ cos γ] from cos θ cos β cos γ, and the result is applied to multiplexer 32. The multiplexer 32 selects a larger value from either 0.5 max[cos θ cos φ, cos φ cos γ] or cos θ cos φ cos γ. The multiplexer 32 outputs the selected value to the reciprocal table 35 which provides the reciprocal of max [cos θ cos φ, cos φ cos γ, cos θ cos β cos γ]. This reciprocal value denotes the G'(β, θ, γ, φ) of equation (11).

Information on cos β is applied to D' (cos β) table 28. The cos β addresses D' (cos β) table 28 which outputs D'(β) to the multiplier 33. The cos φ is applied to $F_\lambda$(cos φ) table 29. The $F_\lambda$(cos φ) table 29 reads $F_\lambda$(φ) of each color component (red, green and blue) using cos φ as an address, and outputs every $F_\lambda$(φ) value to the multipliers 33 and 34.

The multiplier 33 multiplies D' (β) with $F_\lambda$(φ) and outputs the result D' (β) $F_\lambda$(φ) to multiplier 36. The multiplier 36 multiplies $F_\lambda$(φ)D' (β) with G'(β, θ, γ, φ) and outputs $F_\lambda$(φ)D' (β)G' (β, θ, γ, φ) which denotes the specular reflection component Ispec of equation (11). As per the above descriptions, this invention obtains the specular reflection component Ispec with higher accuracy than conventional technologies due to the use of a reciprocal table which allows low accuracy at a final stage of processing.

A diffuse reflection coefficient $K_1$ and cos θ are applied to multiplier 21. The multiplier 21 multiplies $K_1$ with cos θ, obtains $K_1$ cos θ, and outputs $K_1$ cos θ to multiplier 34. The multiplier 34 multiplies the $K_1$ cos θ with $F_\lambda$(φ) and obtains $F_\lambda$(φ)$K_1$ cos θ. Thus the circuit of this example can obtain the diffuse reflection component $I_{diff}$.

EXAMPLE 2

Figure 4:
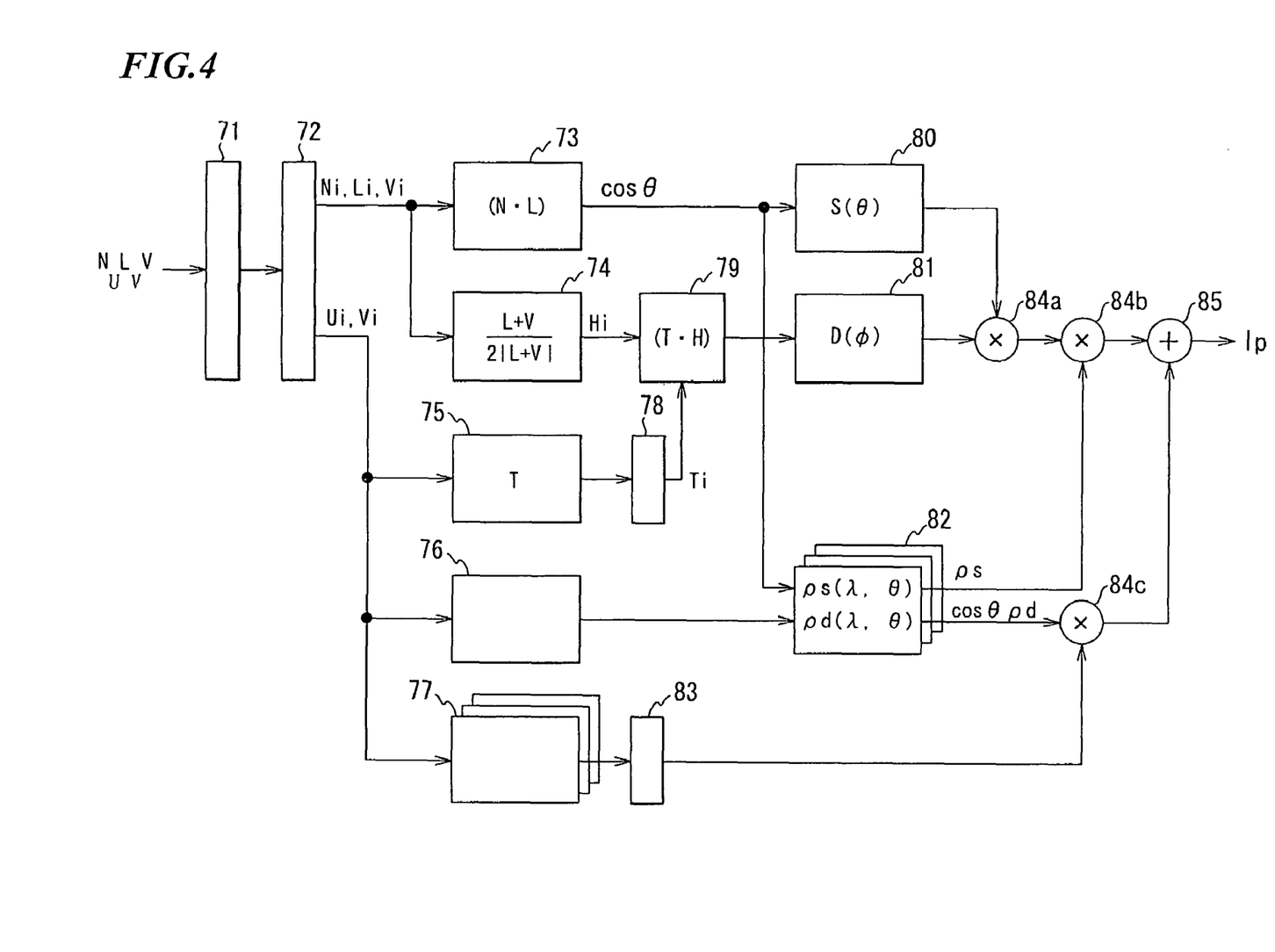
FIG. 4 is a block diagram of the circuit relating example 2.

The example 2 of the present invention is explained with reference to FIG. 4. FIG. 4 shows a block diagram of example 2. As shown in FIG. 4, a surface normal vector N, a light-source incidence vector L, a view vector V and a texture mapping address (U,V) defined at every polygon vertex are applied the polygon-outline interpolator 71. The circuit 71 interpolates the variables along to polygon outline and outputs the interpolated variables to a circuit of span-interpolator 72. The span-interpolator 72 interpolates the variables horizontally between right and left edges on the interpolated outlines. The interpolation in the whole area is, thus, carried out by spanning a horizontal line from bottom to top of polygon. Here, the surface normal, the light-source incidence, the view vector and the mapping address at point i are assigned to Ni, Li, Vi and (Ui,Vi) respectively.

The surface normal vector Ni and light-source incidence vector Li are applied to inner-product circuit 73. The inner-product circuit 73 outputs an inner-product value cos θ using the surface normal vector Ni and the light-source incidence vector Li. The cos θ is obtainable as an inner-product of Ni and Li.

The light-source incidence vector Li and view vector Vi are applied to a half-vector circuit 74. The half-vector circuit 74 computes a half-vector value Hi of the light-source incidence vector Li and view vector Vi. The half-vector is defined by the following equation.

$$H = \left[\frac{(L+V)}{2|V+L|}\right]$$

The texture mapping address (Ui,Vi) is applied to surface tangent table 75, reflectance selection table 76 and texture pattern table 77.

The surface tangent table 75 stores the surface tangent vector T and is addressed by the texture mapping address (Ui,Vi). Four or more surface tangents are read from the table 75 centering around (Ui,Vi) the texture mapping address. The table 75 is implemented by a RAM and the like.

The surface tangent vector T is applied to filter 78 which carries out the filtering and outputs a filtered value Ti. A Sinc, Gaussian or tri-linear scheme is available for this filtering.

The Ti and half-vector Hi are applied to inner-product circuit 79. The inner-product circuit 79 produces an inner-product value of surface tangent Ti and half-vector Hi. The value is applied to distribution function D(φ) table 81 as the address.

The inner-product value (TH) is converted by the following equation (a circuit for equation is not illustrated). In this case, the φ is to be an address for the distribution function D(φ) table 81.

$$φ=π/2-\cos^{-1}(T·H)$$

This example assumes that the slope m of rough surface is distributed uniformly. This enables TH or φ to be an address for the distribution function D(φ). This invention uses the distribution function D(φ) as following equation.

$$D(φ)=\exp\{-(\tan φ/m)^2/4m^2 \cos^4 φ\}$$

A cos θ output from the inner-product circuit 73 is applied to attenuation function S(θ) table 80 and reflectance ρ(θ) table 82. A half-vector Hi from the circuit 74 and surface normal N are used to carry out the inner-product at the inner-product circuit 73. The output of the circuit 73 replace cos θ as the address for the attenuation function table 80 and the reflectance table 82.

The attenuation function table 80 stores attenuation function S(θ,γ) addressed by cos θ or θ. This invention uses cos θ for the address of attenuation function table 80 and outputs an attenuation value S(θ,γ) from the table. This invention allows an approximate value for the attenuation function, so that the γ is not necessary to be a variable.

The table 81 of distribution function $D(\phi)$ stores the $D(\phi)$. This invention reads the $D(\phi)$ addressing by $\phi$. The reflectance selection table 76 stores the selection values of reflectance uniquely defined for objects addressed by the texture mapping address (Ui,Vi). The selection value from the table 76 is applied to the reflectance table 82 as an address. As per the above descriptions, the reflectance per pixel that varies every object and depends on the angle between light-source incidence and surface normal is obtained.

The reflectance table 82 stores diffuse $\rho d(\lambda,\theta)$ and specular $\rho s(\lambda,\theta)$ reflectance at wavelengths of red, green and blue. Thus, the reflectance table stores three values separately according to the three color components. This invention stores $\cos\theta\rho d(\lambda,\theta)$ in the reflectance table 82 instead of $\rho d(\lambda,\theta)$. The reflectance table 82 outputs $\rho s(\lambda,\theta)$ to multiplier 84a and 84b and thus, the specular reflection component is obtained.

The outputs from the tables of attenuation function $S(\theta)$ 80 and distribution function $D(\phi)$ 81 are applied to multiplier 84a. The result $S(\theta)D(\phi)$ and the output ($\rho rs$, $\rho gs$, $\rho bs$) from the reflectance table 84b are applied to multiplier 84b. The result $\rho s\, S(\theta)D(\phi)$ is further applied to adder 85.

The adder 85 receives the $\rho s\, S(\theta)D(\phi)$ and $\cos\theta\rho d$. The adder 85 outputs $\cos\theta\rho d + \rho s\, S(\theta)D(\phi)$, which is a reflection intensity Ip.

The texture pattern table 77 stores three color components of red, green and blue. The table 77 uses RAM addressing by (Ui,Vi) and outputs the colors of red, green and blue to filter 83, which has the same processing as the filter 78.

The color components from the filter 83 and diffuse reflectance $\cos\theta\rho d(\lambda,\theta)$ from reflectance table 82 are applied to multiplier 84c, and the output is added with specular reflection component in adder 85. As processed above, the Ip with texture pattern is obtained at every interpolated point.

INDUSTRIAL APPLICABILITY

The first embodiment of this invention is available for the rendering circuit of computer graphics, further available for the circuit to render the light-reflection on a rough surface and applicable for the computer graphics LSI with small scaled hardware, further applicable for computer graphics systems, e.g., simulators and gaming machines.

The second embodiment of this invention is related to the circuit and device to compute an anisotropic reflection and to render an image which has an anisotropic reflectivity. The second embodiment is available for a real-time visualization for a virtual reality system with high realism by embedding the circuit within a LSI.

What is claimed is:

1. A circuit that computes a reflection intensity for calculating a reflection intensity of computer graphics images, defining the object surface by a set of polygons that have both or either microscopic grooves or partial areas of different reflectance, comprising:
    a means for obtaining a surface normal vector N at every polygon vertex;
    a means for obtaining a light-source incidence L at every polygon vertex;
    a means for obtaining a view vector V at every polygon vertex;
    a means for obtaining a texture mapping address (U,V) at every polygon vertex;
    a means for interpolating the values of said surface normal vector N, said light-source incidence vector L, said view vector V and said texture mapping address (U,V) on polygon interior;
    a means for reading a surface tangent vector Ti using the interpolated texture mapping address, from memory that stores the surface tangent vector Ti that is addressed by interpolated texture mapping address; and
    a means for computing a light-reflection intensity at each interpolated point of polygon interior using interpolated value of surface tangent Ti, interpolated value of surface normal vector Ni, interpolated value of light-source incidence vector Li and interpolated value of view vector Vi.

2. A circuit that computes a light-reflection intensity as recited in claim 1, wherein a texture pattern is separately stored with three color components of red, green and blue in connection with the interpolated texture mapping address;
    blended reflection intensity is computed using the reflectance intensity computed by the circuit as recited in the claim 1, and the texture pattern in connection with the three color-components of red, green and blue.

3. A circuit that computes light-reflection intensity as recited in claim 1, defining $\cos\theta$ as an inner-product of said surface normal vector N and light-source incidence vector L, the means for computing a light-reflection intensity comprising:
    a means for storing and reading a light-attenuation factor $S(\theta)$ addressed by $\theta$ or $\cos\theta$;
    a means for storing and reading a specular reflectance $\rho s$ addressed by $\theta$ or $\cos\theta$;
    a means for storing and reading a diffuse reflectance $\rho d$ or $\cos\theta\rho d$, addressed by $\theta$ or $\cos\theta$;
    a means for storing and reading a reflection distribution function $(D(\phi))$ addressed by function $(\phi)$ that is derived from the interpolated light-source incidence vector Li, the interpolated view vector Vi and the interpolated surface tangent vector Ti;
    a means for multiplying; and
    a means for adding.

4. A circuit that computes light-reflection intensity as recited in claim 3, wherein the value of the specular reflectance $\rho s$ stored and read by said means for storing and reading specular reflectance $\rho s$ is separately stored and read with separated wavelengths of red, green and blue.

5. A circuit that computes light-reflection intensity as recited in claim 3, wherein the value of the diffuse reflectance $\rho d$ or $\cos\theta\,\rho d$ stored and read by said means for storing and reading a diffuse reflectance $\rho d$ or $\cos\theta\,\rho d$ addressed by $\theta$ or $\cos\theta$ is separately stored and read by separated wavelength of red, green and blue.

6. A circuit that computes a light-reflection intensity as recited in claim 3, wherein the function $(\phi)$ that relates to the interpolated light-source incidence vector Li, the interpolated view vector Vi and the interpolated surface tangent vector Ti fulfills the following equation:

$$\phi = \pi/2 - \cos^{-1}(T \cdot H)$$

where Hi is a half-vector of interpolated light-source incidence Li and view vector Vi, and T·H is an inner-product of Hi and Ti.

7. A circuit that computes light-reflection intensity as recited in claim 1, wherein reflection intensity Ip is computed with the following equation:

$$Ip = \cos\theta\rho d + \rho s S(\theta) D(\phi)$$

where Ip is a reflection intensity, $S(\theta)$ is light attenuation factor, $\rho s$ is specular reflectance, $\rho d$ is diffuse reflectance and $D(\phi)$ is reflection distribution function.

8. An image rendering device that comprises the circuit described in any one of claims 1 to 7.

9. A compound anisotropic circuit, relating a computer graphics circuit for expressing light reflectance on an object surface including microscopic grooves and various reflectances, defining the object surface by a set of polygons, and defining surface normal, light-source incidence vector, view vector and texture mapping address at each polygon vertex, comprising:
- a means for defining a surface tangent vector that indicates the direction of a groove on every interior point, storing the surface tangent of a two-dimensional array into memory; and
- a means for interpolating the surface normal vector, light-source incidence vector, view vector and texture mapping address, reading surface tangent from the memory assigned with texture mapping address, and computing a light reflection intensity by using the surface tangent vector, interpolated surface tangent vector, interpolated light-source incidence vector and interpolated view vector.

10. A compound anisotropic circuit as recited in claim 9, wherein a light intensity of interpolated points is determined using:
- a means for reading four or more surface tangents centering around texture mapping address points from memory circuit, filtering the surface tangents and determining the filtered surface vector as a required surface tangent vector at the mapping address point;
- a means for calculating an inner-product of a half-vector, which is defined by view vector and light-source incidence, and a surface normal vector, and implementing a light reflection distribution function table addressed by the inner-product of half-vector and the surface normal vector; and
- a means for implementing a light attenuation function table addressed by the angle between the half vector and the surface normal vector.

11. A compound anisotropic circuit as recited in claim 9, further comprising;
- a means for implementing a reflectance table to store the reflectance at wavelengths of red, green and blue, and deriving a read address for the reflectance table from surface normal, light-source incidence vector and view vector;
- a means for storing two or more sets of reflectance in the reflectance table in correspondence with the number of reflectance defined on a single polygon surface, further storing a reflectance selection bit in memory circuit to select said reflectance from the reflectance table during interpolation, and defining the selection-bit per point of polygon interior in a two-dimensional pattern; and
- a means for reading the reflectance selection bit from the memory circuit using said interpolated texture mapping address], and selecting proper reflectance using both the reflectance selection-bit and the read address of the reflectance table.

* * * * *